United States Patent [19]
Dischert et al.

[11] Patent Number: 4,499,494
[45] Date of Patent: Feb. 12, 1985

[54] TELEVISION GAMMA CORRECTOR WITH SYMMETRICAL RESPONSE ABOUT BLACK-LEVEL

[75] Inventors: Robert A. Dischert, Burlington, N.J.; Robert J. Topper, Rockledge, Pa.

[73] Assignee: RCA Corporation, New York, N.Y.

[21] Appl. No.: 424,233

[22] Filed: Sep. 27, 1982

[51] Int. Cl.³ .......................... H04N 5/20; H04N 9/07
[52] U.S. Cl. ...................................... 358/164; 358/32; 358/41
[58] Field of Search ...................... 358/32, 36, 37, 164, 358/166, 167

[56] References Cited

U.S. PATENT DOCUMENTS

| | | | |
|---|---|---|---|
| 3,196,205 | 7/1965 | Bedford | 358/32 |
| 3,845,326 | 10/1974 | Godden | 358/164 |
| 4,202,009 | 5/1980 | Ushiyama | 358/32 |
| 4,249,208 | 2/1981 | Haenen | 358/164 |
| 4,415,923 | 11/1983 | Noda | 358/32 |

OTHER PUBLICATIONS

"Television Broadcasting", pp. 230–232, by Harold E. Emmes, Second Edition, First Printing 1979, by Howard W. Sams & Co.

*Primary Examiner*—Tommy P. Chin
*Attorney, Agent, or Firm*—E. M. Whitacre; W. H. Meise

[57] ABSTRACT

A television camera or other source of color-representative signals such as R, G and B includes a matrix to which the R, G and B signals are applied to form luminance (Y) and color-difference (I,Q) signals. The source and matrix are coupled together by way of a signal path having a particular response or transfer function for the R, G and B signals over their normal range. Unavoidable noise occurring in the signals near black level may perturb the color-representative signals, and causes color errors. The errors are reduced by arranging the coupling to have a response to negative noise peaks into the blacker-than-black region. The response outside this normal range is complementary to the response within the normal range. In a particular embodiment the coupling includes a gamma corrector which has complementary response in the blacker-than-black region.

14 Claims, 5 Drawing Figures

TELEVISION GAMMA CORRECTOR WITH SYMMETRICAL RESPONSE ABOUT BLACK-LEVEL

BACKGROUND OF THE INVENTION

This invention relates to reduction of color distortion due to the effects of noise on gamma correctors.

Gamma correctors are used in television systems to correct for the nonlinearity of signal-to-light transducers such as kinescopes or light-to-signal transducers such as camera tubes or vidicons. The gamma corrector generally takes the form of a load resistor network for a transistor which network is interconnected with diodes to provide a plurality of gain break points at particular voltage values. A gain/voltage characteristic is thereby generated which is selected to compensate for the nonlinearities of the transducer. The video signal is ordinarily closely controlled before being applied to the gamma corrector, because the absolute value of the signal establishes the instantaneous gain of the gamma amplifier stage. Thus, it is common in a camera to clamp the video signal to ground during the blanking intervals, so that the black level is always at the origin of the gamma curve. Grey and white-going portions of the signal are then more positive than ground, and are translated through the gamma corrector with the correct curvature or nonlinearity for compensation of the nonlinearity of the transducers. The curvature of the gamma corrector may also correct for such other effects as defects in the color motion-picture film in a telecine converter, and the like.

It has been observed that color errors result from noise superimposed on the black portions of the television signal. The color error results from rectification of noise near black signal level. The rectification may result from the properties of the gamma corrector, which has no response (no output signal) for signal excursions into the blacker-than-black region resulting from noise, or the rectification may result from an actual black-level clipper preceding the matrix. This in turn causes the signal attributable to each of the R, G or B signals to be superimposed on a varying component created by rectification of the noise. Even if the R, G and B tubes in a three-tube color camera had exactly the same noise color error would still occur on an ordinary colored image because the rectified noise component of each signal represents a different proportion of the signal in that channel, and the color of the image displayed from composite color signals depends upon their relative proportions. For a white image, color error would occur even if the three R, G and B tubes produced the same amount of noise, if the sensitivities of the tubes were different.

It might be thought that the black level of the signal could be moved up on a standard gamma curve so that the peak negative-going noise component would not drop into the region in which the gamma corrector gives no response, but this has been found not to be sufficient to correct the color distortion resulting from noise near black level.

SUMMARY OF THE INVENTION

An improved gamma correction arrangement for a television signal having regularly recurring signal amplitude extremes such as black level includes a source of synchronizing signals for producing a sampling signal during each of the black intervals. A clamp is coupled to the source of synchronizing signals, to the source of television signals and to a reference voltage source for clamping the amplitude extreme to a reference voltage to thereby produce a clamped television signal. A gamma correction translator is coupled to the clamp to provide a selected nonlinear transfer function for the clamped television signal over its normal range. Unavoidable noise superimposed upon the television signal may cause the signal applied to the gamma correction to exceed its normal range, which causes the noise to be rectified and perturb the value of the output signal. The perturbation is eliminated by a region of response of the gamma corrector having a transfer function which is complimentary to the transfer function in the normal range.

DESCRIPTION OF THE INVENTION

Figure 1:
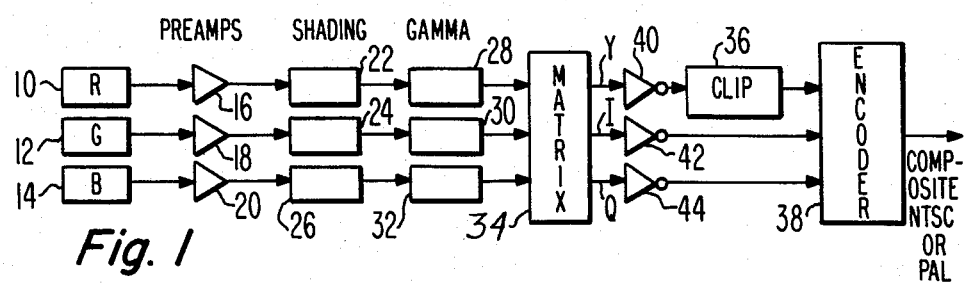
FIG. 1 is a simplified block diagram of a television camera.

In FIG. 1, 10, 12 and 14 designate red, green and blue camera tubes receiving light of corresponding colors from a color-splitting prism (not shown). Tubes 10, 12 and 14 are coupled to preamplifiers 16, 18 and 20, respectively, for amplifying the signals therefrom and for applying the signals to blocks 22, 24 and 26, respectively, which blocks include other camera functions such as shading correction. The signals processed by blocks 22, 24 and 26 are applied to gamma correctors 28, 30 and 32 respectively, in which the red, green and blue signals are processed in a non-linear fashion to compensate for the nonlinearities of the camera tubes, the kinescope (not shown) on which the signals are to be displayed, or both. The gamma corrected R, G and B signals are applied to a matrix 34 as is known for generating Y, I and Q (or Y, U and V) signals for ultimate application to an encoder 38 which encodes the Y, I and Q signals into a standard NTSC or PAL format. Inverting amplifiers 40, 42, and 44 are inserted between matrix 34 and encoder 38 as required to provide the proper signal polarity. A black level clipper 36 is included in the luminance (Y) path between inverting amplifier 40 and encoder 38.

As mentioned, rectification of black-level noise by gamma correctors 28, 30 and 32 can create offset voltages upon which the R, G and B signals ride, which offset voltages perturb the color difference signals generated by matrix 34.

Figure 2:
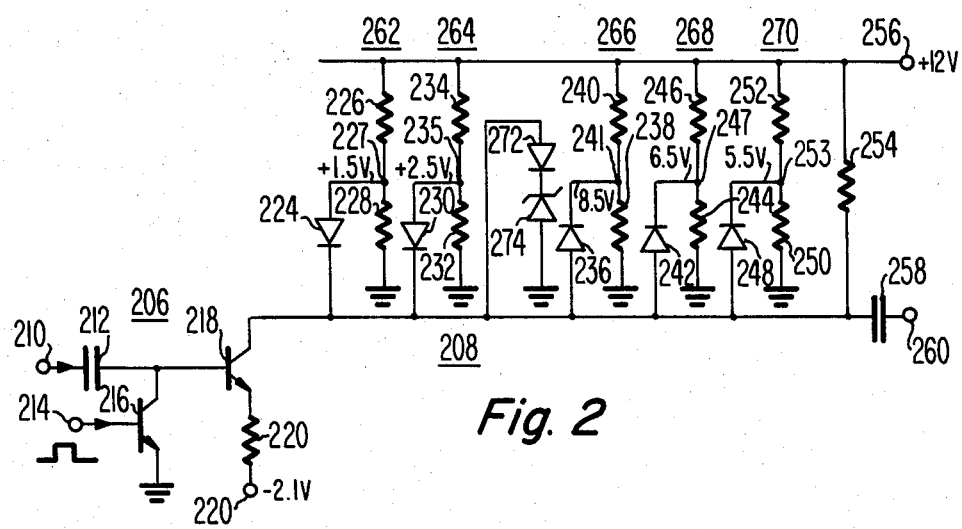
FIG. 2 is a schematic diagram showing a clamp and gamma correction translator according to the invention which can be used in the arrangement of FIG. 1.

The gamma corrector of FIG. 2 reduces or eliminates the perturbation of the signal by reducing or eliminating rectification of noise near black level. The arrangement of FIG. 2 includes a clamp designated generally as 206 and a gamma translator designated generally as 208. Clamp 206 includes a series capacitor 212 coupled to an input terminal 210 and to the collector of a bipolar transistor 216. The emitter of transistor 216 is coupled to a reference potential such as ground and its base is connected to a terminal 214 for receiving pulses. The pulses applied to terminal 214 occur during the blanking intervals in known fashion so as to charge capacitor 212 to a voltage which maintains the black level of the television signal clamped at ground potential. The clamped television signal is applied to the base of a transistor 218, the emitter of which is coupled by way of a resistor 220 to a terminal 222 to which a potential of −2.1 volts is applied. Transistor 218 is part of gamma translating circuit 208 which is essentially an inverting amplifier in which resistor 254 coupled between the collector of transistor 218 and a B+ terminal 256 is the principal load impedance. The collector of transistor 218 is AC-coupled to an output terminal 260 by way of a coupling capacitor 258. The remainder of the circuitry in FIG. 2 includes a number of voltage sources 262–270 having selected internal impedances which are coupled to the collector of transistor 218 by diodes. There are five such voltage sources in all. Voltage divider 262 formed by resistors 226, 228 establishes an open-circuit voltage of +1.5 volts at a node 227. Similarly, voltage divider 264 consisting of resistors 232, 234 produces +2.5 volts at circuit node 235. Diodes 224 and 230 have their cathodes connected to the collector of transistor 218 and anodes connected to 227,235, respectively. Voltage divider 270 formed by resistors 250 and 252 produces 5.5 open-circuit volts at node 253, divider 268 with resistors 244–246 produces 6.5 volts at node 247 and divider 266 with resistors 238–240 produces 8.5 volts at node 241. Diodes 248, 242 and 236 have their anodes connected to the collector of transistor 218 and their cathodes coupled to nodes 253, 247, and 241, respectively. A zener diode 274 has its anode connected to ground and its cathode coupled to the cathode of diode 272, the anode of which is connected to transistor 218.

So long as none of the diodes are conducting, the AC gain A of the stage 208 is established as quotient $$A = R_{254}/R_{220} \qquad (1)$$

For output voltages exceeding (more positive than) the sum of the voltage of a particular voltage divider 266–270 plus a diode drop, the internal or Thevenized impedance of that voltage divider is effectively placed in parallel with resistor 254, thereby reducing the numerator of equation (1) and decreasing the incremental gain. Thus, as voltage dividers 266–270 are successively paralleled with resistor 254, the incremental gain decreases. For voltages exceeding the sum of the avalanche or "Zener" breakdown voltage of diodes 272 and 274, the impedance placed in parallel with load resistor 254 is essentially zero, reducing the incremental gain of translating stage 208 to zero, and thereby causing a white clipping action.

Voltage dividers 262 and 264 are paralleled with load resistor 254 when the voltage at the collector of transistor 218 is less (more negative) than the divider open-circuit voltage minus one diode drop. Thus, for decreasing collector voltages, stages 264 and 262 are successively paralleled with resistor 254, reducing the incremental gain in steps.

Figure 3:
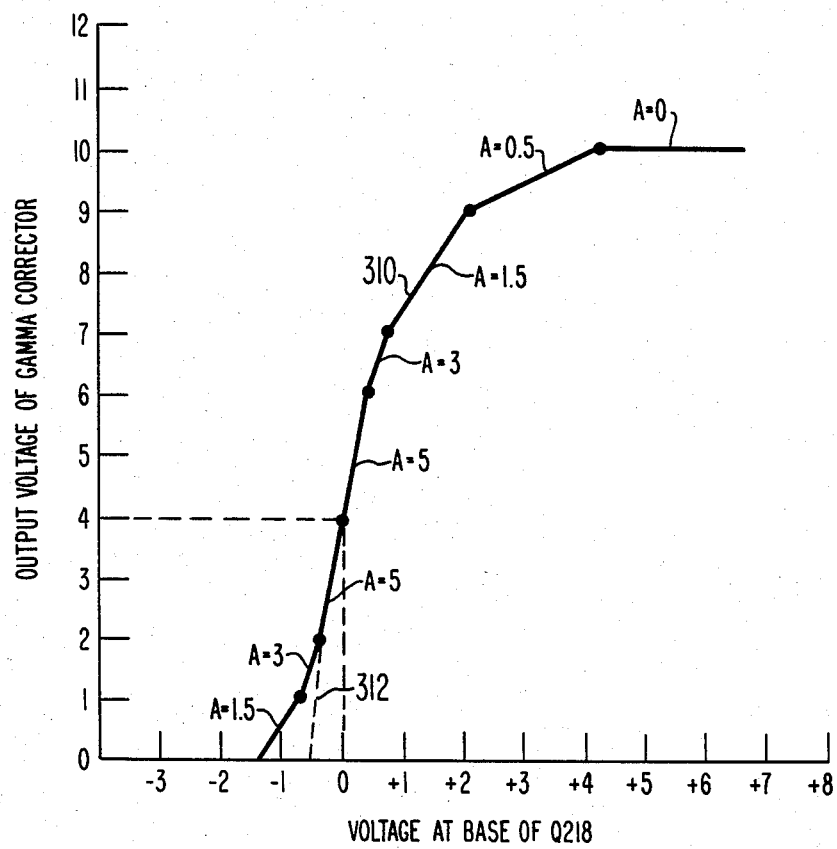
FIG. 3 illustrates the transfer function of the arrangement of FIG. 2.

In the embodiment of the invention illustrated in FIG. 2, the following resistor values provide the gains illustrated in FIG. 3 (neglecting the dynamic impedance of the diodes, which tends to smooth the curve). Diode voltage drops of 0.5 volts are assumed.

| Resistor | Resistance (Kilohms) |
| --- | --- |
| 220 | 2 |
| 226 | 48 |
| 228 | 6.9 |
| 232 | 18.9 |
| 234 | 72 |
| 238 | 5.1 |
| 240 | 2.1 |
| 244 | 13.1 |
| 246 | 1.1 |
| 250 | 27.7 |
| 252 | 32.7 |
| 254 | 10 |
| Zener 274 | 9.5 V |

In operation for the above resistor values it will be noted that the gain of gamma correction translator circuit 208 is five for input voltages near 0 volt (ground level). The region having a gain of five is symmetrically disposed about the operating point for a black-level signal (0 input volts; 4 output volts). Similarly, that portion of the gain curve having a gain of three is symmetrically disposed about the same point and is complementary. In this context, complementary means that the gain curve has opposite directions of curvature about a point of inflection. It will be noted that the portions of the curve having a gain of 1.5 begin at points symmetrically located about the black-level operating point but that the lower portion of the curve is truncated. This truncation is at a point beyond the peak noise value expected in the negative direction. White level clipping (portion A=0 of curve 310) may cause noise rectification near white level but does not affect colorimetry. The smooth complementary curvature of response curve 310 in the region about black level merely translates the noise component of the signal without rectification such as would be caused by clipping or by maintaining the curvature without a point of inflection as indicated by dotted line portion 312. Thus, no perturbing direct voltage offset is produced by noise rectification and the color signals are translated directly to matrix 34 with their noise contributions. Matrix 34 produces Y, I and Q signals in known fashion with noise intact. In matrix 34, the three signal components are added in particular amounts as known, and the noise components are also added and tend to cancel since they are not phase coherent. Since the I and Q signals are color difference signals their values are generally near zero and, in any case, take on positive and negative values which cannot be clipped. The luminance signal produced by matrix 34 is applied to a conventional black-level clipper having no response for noise components in the blacker-than-black region. While rectification occurs in clipper 36, this results only in a change in the luminance signal which ordinarily has a relatively large magnitude. Since no clipping occurs in the R, G or B signals and the formation of the I and Q signals results in partial noise cancellation, no degradation of the color signal results.

Figure 4:
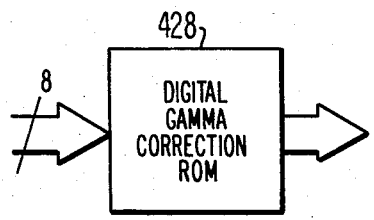
FIG. 4 is a block diagram of a digital gamma corrector having a transfer function corresponding to that of the arrangement of FIG. 2.

FIG. 4 is a block diagram of a digital gamma correction translating circuit in the form of a read only memory (ROM) 428. Such a ROM may be used in a digital television signal processing circuit, and operates by producing for each 8-bit input address an 8-bit output signal corresponding generally with the curve of FIG. 3. ROM 428 is arranged to have response in the blackerthan-black region which is complementary to the response about black level so as to eliminate color errors.

Figure 5:
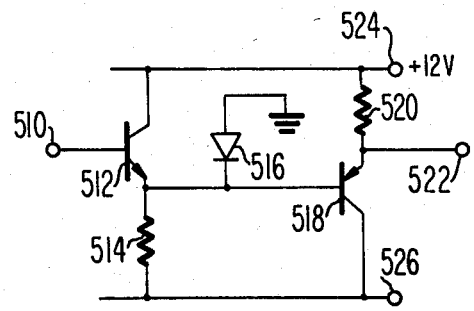
FIG. 5 is a schematic diagram of an analog black-level clipper which can be used in the arrangement of FIG. 1.

FIG. 5 illustrates an analog black-level clipper suitable for use as clipper 36 in FIG. 1. The clipper of FIG. 5 includes an emitter-follower 512, 514 coupled to an input terminal 510 for buffering the input and for translating the signal down by VBE. The emitter of transistor 512 is coupled to the base of the transistor 518 of a further emitter-follower including an emitter resistor 520. The cascade of complementary emitter-followers results in a net zero voltage offset through the circuit. A diode 516 has its anode coupled to ground and its cathode connected to the emitter of 512. When the input signal at terminal 510 is at ground level diode 516 is on the threshold of conduction. Positive-going excursions of the signal are translated directly to output terminal 32 without voltage offset, while excursions more negative than ground level cause diode 516 to conduct and clamp the voltage at terminal 522 to zero volts.

A digital black-level clipper (not shown) can be formed as a ROM similar to ROM 428, loaded with a transfer function having zero output response for digital addresses corresponding to blacker-than-black.

Other embodiments of the invention will be apparent to those skilled in the art. A camera may derive R, G and B signals (or their complements) by the use of a single imager with a striped or checkerboard color filter, in known fashion, rather than using multiple tubes and a color-splitting prism. The camera may have the gamma correction function after the matrix by which Y, I and Q are generated, while maintaining the noise associated with the color representative R, G and B signals (or their complements) unrectified from its source through to the matrix in which color-difference signals and luminance signals are generated. In this latter case, the transfer function from the source of signals to the matrix may be linear over the normal range of the color-representative signals, and the complementary transfer function in the blacker-than-black region will also be linear.

What is claimed is:

1. An improved gamma correction arrangement for a television signal having a normal range of signal amplitude extremes and having a particular signal amplitude extreme recurring regularly, comprising:
    a source of said television signal;
    a source of synchronizing signals for producing a sampling signal during each of the regular recurrences of said particular signal amplitude extreme;
    a reference voltage source;
    clamping means coupled to said source of synchronizing signals, to said source of said television signal and to said reference voltage source for clamping said particular signal amplitude extreme to a clamp voltage related to said reference voltage, thereby producing a clamped television signal;
    gamma correction translation means coupled to said clamping means for providing an output signal in response to a selected nonlinear transfer function for said clamped television signal over said normal range of said clamped television signal, whereby unavoidable noise superimposed on said television signal creates a noisy television signal which causes said clamped television signal applied to said gamma correction translation means to exceed said normal range, whereby said noise may be rectified and perturb the value of said output signal;
    wherein the improvement comprises range extension means coupled to said gamma correction translation means for extending the operating range of said gamma correction translation means whereby it responds to said noisy television signals in a region outside said normal range with a transfer function which is complementary to said selected nonlinear transfer function thereby reducing said perturbation.

2. An arrangement according to claim 1 wherein said particular signal amplitude extreme is black level, recurring regularly during horizontal blanking intervals.

3. An arrangement according to claim 2 wherein said sampling signal is a horizontal-rate blanking signal and said clamping means comprises a series capacitor and a gate operated in synchronism with said horizontal blanking signal.

4. An arrangement according to claim 1 wherein said gamma correction translation means comprises:
    controllable voltage-to-current converter means for producing an output current having a particular value when the input signal thereto is at said clamp voltage;
    load impedance means coupled to said voltage-to-current converter means for generating said output signal in response to said output current from said voltage-to-current converter means; and
    first load impedance varying means for varying said load impedance means in response to the instantaneous value of said output signal over a normal range of said output signal related to said normal range of said clamped television signals.

5. An arrangement according to claim 4 wherein said range extension means comprises second load impedance varying means for varying said load impedance means in response to the instantaneous value of said output signal over a range exceeding said normal range, thereby preventing rectification of excursions of said output signal outside of said normal range which may be caused by noise.

6. An arrangement according to claim 5 wherein said first load impedance varying means varies said load impedance means in a manner to create a first nonlinear transfer function through said gamma correction translation means over said normal range of said output signal; and
    said second load impedance varying means varies said load impedance means in a manner to create a second nonlinear transfer function over said range exceeding said normal range, which second nonlinear transfer function is complementary to said first nonlinear transfer function.

7. An arrangement according to claims 1, 4 or 5 wherein said particular signal amplitude extreme is the black level.

8. An arrangement according to claim 5 wherein:
    said first and second load impedance varying means comprise interconnected resistance means;
    said first load impedance varying means comprises first unidirectional current conducting means coupled to points in said interconnected resistance means and coupled to receive said output signal; and
    said second load impedance varying means comprises second undirectional current conducting means oppositely poled relative to said first unidirectional current conducting means for responding to said output signals of occasioned by said excursions of said output signal outside of said normal range.

9. A color television camera comprising:

a plurality of image sensors for forming color-representative signals representative of different colors in the image, said signals representing the amount of light of the particular color at a particular point on said image, said signals being subject to black-level noise;

a like plurality of gamma correction means, each of said gamma correction means being coupled to one of said image sensors respectively, said gamma correction means being arranged to translate said color-representative signals and any black-level noise associated therewith without rectification of said black-level noise;

matrix means coupled to said plurality of gamma correction means for generating from said color-representative signals with unrectified black-level noise other signals including luminance-representative signals and color-difference signals; and utilization means coupled to said matrix means for receiving therefrom luminance signal components and bidirectional color-difference signals derived from said color-representative signals in which noise has not been clipped near black level.

10. A camera according to claim 9 further comprising:

black-level clipping means coupled to receive said luminance-representative signals for thereby eliminating excursions of said luminance signals into a blacker-than-black region.

11. An improved television signal processing arrangement comprising:

a source of a plurality of color-representative television signals, each of said plurality of color-representative television signals being representative of a particular predetermined color of the television image;

a matrix for receiving color-representative signals at a plurality of input terminals for generating therefrom a luminance-representative signal and at least one color-difference signal; and coupling means coupled to said source of television signals and to said input terminals of said matrix for coupling said color-representative signals to said input terminals of said matrix, whereby unavoidable noise occurring near the black-level of said color-representative signals creates excursions into the blacker-than-black portion of said color representative signals which may produce a signal perturbing said color-difference signal;

wherein the improvement lies in that said coupling means responds within at least a portion of said blacker-than-black region with a transfer function which is complementary to the response of said coupling means to said color-representative signals over their normal range.

12. An arrangement according to claim 11 wherein said response of said coupling means within said blacker-than-black region is truncated at a level exceeding the peak noise excursion within said blacker-than-black region.

13. An arrangement according to claim 11 wherein sad source of color-representative signals comprises imaging means having a nonlinear transfer function over said normal range of said color-representative signals, and said transfer function of said coupling means has an oppositely-directed nonlinearity for correcting the overall transfer function of said television signal processing arrangement to linear, whereby said transfer function of said coupling means in said blacker-than-black region is complementary to said oppositely-directed nonlinearity.

14. A color television camera, comprising:

a plurality of image sensors for forming color-representative signals representative of different colors in the image, said signals representing the amount of light of the particular color at a particular point on said image, said color-representative signals being subject to black-level noise;

a like plurality of gamma correction means, each of said gamma correction means being coupled to one of said image sensors, respectively, each of said gamma correction means being arranged to translate a corresponding one of said color-representative signals, and exhibiting a response to said one of said color-representative signals in a range corresponding to the region between white and black, and also exhibiting a response to said one of said color-representative signals in a region corresponding to blacker-than-black for inhibiting rectification of said black-level noise for generating color-representative signals with inhibited rectification of black-level noise;

matrix means coupled to said plurality of gamma correction means for generating from said color-representative signals with inhibited rectification of black-level noise other signals including luminance-representative signals and color-difference signals; and utilization means coupled to said matrix means for receiving therefrom said luminance-representative signal components and said color-difference signals derived from said color-representative signal with inhibited black-level noise.

* * * * *